United States Patent [19]

Lutgen et al.

[11] Patent Number: 5,228,585
[45] Date of Patent: Jul. 20, 1993

[54] VARIABLE CAPACITY VEHICLE-MOUNTED CRYOGENIC STORAGE VESSELS AND METHOD OF MAKING SAME

[75] Inventors: H. Michael Lutgen, New Prague, Minn.; Keith W. Gustafson, Canton, Ga.

[73] Assignee: Minnesota Valley Engineering, Inc., New Prague, Minn.

[21] Appl. No.: 989,973

[22] Filed: Dec. 11, 1992

Related U.S. Application Data

[63] Continuation of Ser. No. 750,918, Aug. 28, 1991.

[51] Int. Cl.$^5$ ............................................. B65D 6/00
[52] U.S. Cl. .................................... 220/4.14; 220/562; 220/584; 220/586; 220/421; 220/425; 220/468; 220/612; 220/627; 220/678
[58] Field of Search ............... 220/562, 581, 583, 584, 220/586, 4.14, 4.15, 420, 425, 468, 669, 612, 627, 678, 679, 680, 901, 565, 4.12, 421, 422

[56] References Cited

U.S. PATENT DOCUMENTS

| | | | |
|---|---|---|---|
| 1,268,980 | 6/1918 | Krumholz | 220/612 |
| 2,513,749 | 7/1950 | Schilling | 220/420 X |
| 3,024,938 | 3/1962 | Watter | 220/679 X |
| 3,064,344 | 11/1962 | Arne | 220/425 X |
| 3,246,789 | 4/1966 | Progler | 220/901 X |
| 3,904,067 | 9/1975 | Kuniyasu et al. | 220/901 X |
| 3,944,106 | 3/1976 | Lamb | 220/4.12 |
| 4,241,843 | 12/1980 | Walker et al. | 220/468 X |
| 4,932,546 | 6/1990 | Stannard | 220/581 |

FOREIGN PATENT DOCUMENTS 0579840  8/1946  United Kingdom .............. 220/420

Primary Examiner—Allan N. Shoap
Assistant Examiner—Stephen Cronin
Attorney, Agent, or Firm—Rockey, Rifkin and Ryhter

[57] ABSTRACT

A vehicle-mounted double-walled ellipsoidal cryogenic storage vessel includes an inner vessel enclosed by an outer shell to form an insulation chamber therebetween. Both the inner vessel and the outer shell are formed in the same manner. An elliptical pressure head of circular cross-section is cut along a diameter to form two end halves. An end wall is secured between the two end halves to form an end, which is secured to an end of a wall like cross-section. This process is repeated with another pressure head to form the other end of the storage vessel. Storage vessels may be constructed of any size desired to allow sufficient ground clearance when mounted under a vehicle.

2 Claims, 1 Drawing Sheet

VARIABLE CAPACITY VEHICLE-MOUNTED CRYOGENIC STORAGE VESSELS AND METHOD OF MAKING SAME

This is a continuation of copending application Ser. No. 07/750,918 filed on Aug. 28, 1991.

BACKGROUND OF THE INVENTION

The present invention relates generally to cryogenic storage vessels and more particularly to vehicle-mounted tanks capable of being manufactured in a variety of sizes.

The typical cryogenic storage vessel consists of a cylindrically-shaped inner storage vessel for holding liquid natural gas ("LNG") or other cryogen under pressure ranging from about 50 psig to about 300 psig. A relatively thin outer shell of the same general shape and slightly larger dimension surrounds the inner storage vessel, forming an insulation chamber therebetween. The outer shell has a port to allow evacuation of air from the insulation chamber.

Prior to evacuation, thermal insulating material is disposed in the insulation chamber to prevent radiant and conductive heat transfer between the external environment and the internal storage vessel. Cryogenic storage vessels of this type are generally described in U.S. Pat. No. 4,548,335 to Remes.

One particular use for cryogenic vessels is to store LNG, which may be used to fuel specially equipped vehicles. The LNG is stored in on-board vessels analogous to the gas tank on conventional automobiles. On these vehicles, space is limited, so the size and shape of the LNG storage vessel must be optimized. A vessel having a horizontal dimension greater than its vertical dimension allows greater storage capacity while maintaining ground clearance. However, different types of vehicles have different space limitations. Ellipsoidal storage vessels can be specially fabricated, but providing matched pairs of pressure heads is difficult and time consuming. A unique forming die must be made for each desired size of storage vessel. A cryogenic storage vessel that may be easily and cheaply fabricated for assembly in a wide range of sizes to fit various vehicle designs is desirable.

Accordingly, it is a general object of the invention to provide a vehicle-mounted cryogenic storage vessel.

It is a further object of the invention to provide such a vessel that may be assembled in a variety of sizes.

It is another object of the invention to provide such a vessel that is of durable, low-cost construction.

These and other objects of the invention will become apparent when the following detailed description of the invention is read in conjunction with the accompanying drawings.

DETAILED DESCRIPTION OF A PREFERRED EMBODIMENT

Figure 1A:
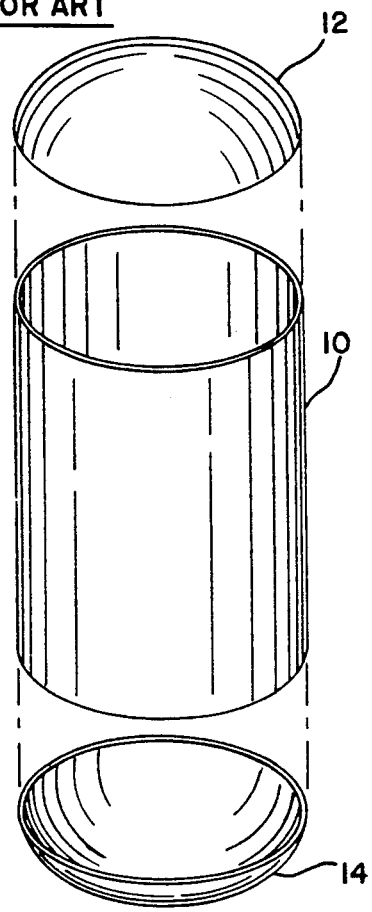
FIG. 1A is a perspective, exploded view of an LNG tank constructed by methods commonly known in the art.

Referring to the drawings, FIG. 1A shows a cryogenic storage vessel constructed in accordance with well-known methods. A metal sheet 10 is formed into a cylinder by welding two opposite edges together. A pair of hemispherical pressure heads 12, 14 are then secured to the metal sheet 10. It should be noted that both the inner storage vessel and the outer shell of a double-walled cryogenic storage vessel are constructed using the same methods. The pressure heads 12, 14 are fabricated in a wide range of sizes and specifications; however, cryogenic storage vessels constructed with these pressure heads must be generally cylindrical in shape. Special shapes are difficult to produce and very expensive.

As previously noted, an efficient method of constructing desirable. Often, cylindrical vessels do not allow enough ground clearance for this purpose.

Figure 1B:
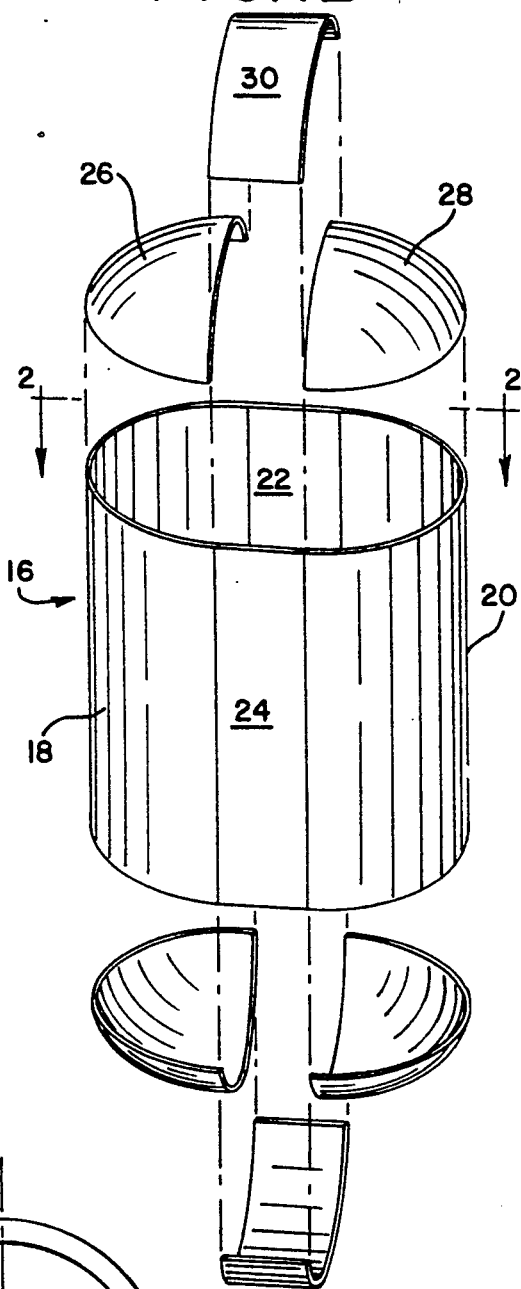
FIG. 1B is a perspective, exploded view of an LNG tank constructed according to the present invention.

FIG. 1B shows a cryogenic storage vessel constructed according to the teachings of the present invention. A vessel body 16 is constructed from a pair of semi-circular wall portions 18, 20. A pair of flat wall extensions 22, 24 of any desired length are welded to the semi-circular wall portions 18, 20 to form a wall of elliptical cross section. Alternatively, the body 16 may be formed of one sheet of metal. To do so the sheet is roll formed into the desired ellipsoidal shape, and its ends are welded.

A cylindrical pressure head of the type previously described is cut along its diameter to form two halves 26, 28. A curved insert 30 is secured as by welding between the end halves 26, 28. The assembly consisting of the two halves 26, 28 and the insert 30 is secured to one end of the vessel body 16.

Similarly, a second pressure head is formed and welded to the other end of the body 16. As will be apparent to one of ordinary skill in the art, the construction techniques described are equally applicable to both the inner storage vessel and the outer shell. The outer shell is of the same general shape as the inner storage vessel, but of slightly larger dimension. In some applications, an outer shell is not required. In that case, a single shell made according to the invention would be employed.

Various methods of insulating cryogenic storage vessels are well known in the art and are described, for example, in U.S. Pat. No. 4,579,249 issued to Patterson et al. and U.S. Pat. No. 4,461,398 issued to Argy. If fiberglass sheets or super insulation are used as insulating material, they are wrapped around the outer surface of the inner vessel before the outer shell is placed thereover. The inner vessel and outer shell are spaced from each other by support members. The outer shell typically includes a valve 37 (FIG. 2) to facilitate evacuation of the insulation chamber formed therebetween after construction of the storage vessel has been completed.

Figure 2:
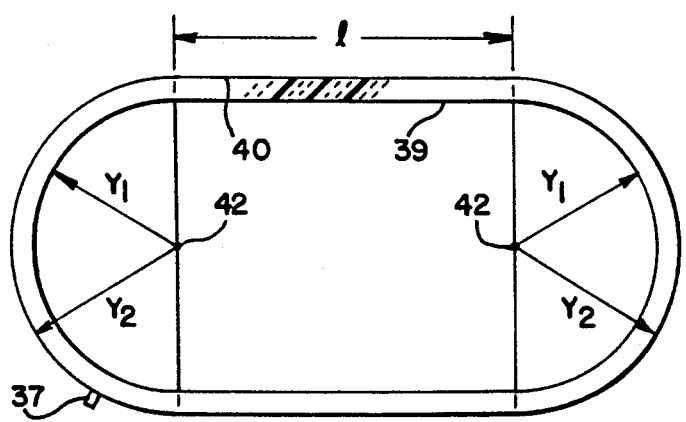
FIG. 2 is an end view in section along the lines 2—2 of FIG. 1B of an LNG tank constructed according to the present invention.

FIG. 2 is useful in explaining the benefits of the present invention in terms of the variability of dimensions allowed thereby. The inner storage vessel 39 is enclosed within the outer shell 40. Each has a pressure head secured thereto. Each pressure head has a radius as defined hereafter based upon its diameter before it was cut. These radii determine the required dimensions of the walls 39 and 40. Specifically, the pressure head for the inner shell 39 has a radius $r_1$ about a point 42. The outer pressure head halves have a radius $r_2$ about the same point 42.

The length 1 of both the shells 39 and 40 may vary depending on the capacity of the vessel desired. It will be apparent to one of ordinary skill in the art that an insulated cryogenic storage vessel of any size desired may be constructed by varying $r_1$, $r_2$ and 1. The only limitation being the availability of pressure heads having the desired radius. Thus, cryogenic storage vessels may be constructed to fit in a wide range of vehicles.

The present invention has been described with respect to certain embodiments and conditions, which are not meant to limit the invention. Those skilled in the art will understand that variations from the embodiments and conditions described herein may be made without departing from the invention as set forth in the appended claims.

What is claimed is:

1. A vehicle-mounted, double-walled storage vessel for receiving cryogenic fluids and having an elliptical cross-section to maximize ground clearance, comprising:

(a) an inner shell of elliptical cross-section, said inner shell formed of at least four separate pieces including a pair of semi-circular wall portions of radius $r_1$ connected to a pair of flat extension portions of length 1; for joining said semi-circular wall portions;

(b) a pair of elliptical pressure heads for sealing the ends of said inner shell, each of said pressure heads formed of at least three separate pieces including a pair of quarter-spherical sections having said radius $r_1$ connected to a rectangular extension section having a curved profile for joining said quarter-spherical sections;

(c) an outer shell of generally elliptical cross-section, said outer shell formed of at least four separate pieces including a pair of semi-circular wall portions of a radius $r_2$, greater than $r_1$, connected to a pair of flat extension portions of length 1 for joining said semi-circular wall portions and disposed about said inner shell to define an insulation space therebetween; and (d) a pair of elliptical pressure heads for sealing the ends of said outer shell, each of said pressure heads formed of at least three separate pieces including a pair of quarter-spherical having said radius $r_2$ connected to a rectangular extension section having a curved profile for joining said quarter-spherical sections.

2. The storage vessel of claim 1 further comprising means to permit the formation of a partial vacuum is said insulation space.

* * * * *